(12) United States Patent
Goyal (10) Patent No.: US 10,614,012 B2
(45) Date of Patent: Apr. 7, 2020

(54) SYSTEM AND METHOD FOR CONTROLLING THE PERFORMANCE OF SERIAL ATTACHED SCSI (SAS) TARGET DEVICES

(71) Applicant: Microsemi Storage Solutions, Inc., Aliso Viejo, CA (US)

(72) Inventor: Sanjay Goyal, Roseville, CA (US)

(73) Assignee: Microsemi Storage Solutions, Inc., Chandler, AZ (US)

( * ) Notice: Subject to any disclaimer, the term of this patent is extended or adjusted under 35 U.S.C. 154(b) by 0 days.

(21) Appl. No.: 16/197,109

(22) Filed: Nov. 20, 2018

(65) Prior Publication Data

US 2019/0213156 A1 Jul. 11, 2019

Related U.S. Application Data

(60) Provisional application No. 62/615,273, filed on Jan. 9, 2018.

(51) Int. Cl.
*G06F 13/38* (2006.01)
*G06F 13/40* (2006.01)
(Continued)

(52) U.S. Cl.
CPC .............. *G06F 13/385* (2013.01); *G06F 3/06* (2013.01); *G06F 11/3409* (2013.01);
(Continued)

(58) Field of Classification Search
CPC ............. G06F 13/4027; G06F 13/4022; G06F 3/0689; G06F 3/067
See application file for complete search history.

(56) References Cited

U.S. PATENT DOCUMENTS

| 7,584,319 | B1 * | 9/2009 | Liao ..................... G06F 13/4022 370/357 |
| 8,095,760 | B2 * | 1/2012 | Mizuno ................. G06F 3/0613 361/679.4 |

(Continued)

*Primary Examiner* — Brian T Misiura
(74) *Attorney, Agent, or Firm* — Glass and Associates; Kenneth Glass (57) ABSTRACT

A system and method for controlling the performance of one or more target devices. A connection request for a target device of a plurality of target devices is received at a serial attached SCSI (SAS) Expander from an SAS initiator device, wherein a maximum performance availability value is associated with the target device. If the current performance availability value of the target device indicates that the target device does have availability to service the connection request, the connection request from the SAS initiator device is accepted and a connection is established between the SAS initiator device and the target device. Alternatively, if the current performance availability value of the target device indicates that the target device does not have availability to service the connection request, the connection request from the SAS initiator device is rejected and a connection is not established between the SAS initiator device and the target device. Traffic flow between the devices is measured and the current performance availability value of the target device is updated to control the performance of the target device.

18 Claims, 6 Drawing Sheets

(51) Int. Cl.
   *H04L 12/26*    (2006.01)
   *G06F 11/34*    (2006.01)
   *G06F 3/06*     (2006.01)

(52) U.S. Cl.
   CPC ...... *G06F 13/4022* (2013.01); *G06F 13/4045* (2013.01); *H04L 43/0817* (2013.01); *H04L 43/0894* (2013.01); *G06F 2213/0028* (2013.01)

(56) References Cited

U.S. PATENT DOCUMENTS

| | | | | |
|---|---|---|---|---|
| 8,560,746 | B2* | 10/2013 | Honjo | G06F 3/0607 710/116 |
| 8,656,058 | B2* | 2/2014 | Johnson | G06F 11/2007 710/1 |
| 8,683,162 | B2* | 3/2014 | Ando | G06F 3/0605 711/165 |
| 8,843,671 | B1* | 9/2014 | Tabor | G06F 3/061 710/15 |
| 9,086,807 | B2* | 7/2015 | Okada | G06F 3/061 |
| 9,135,193 | B2* | 9/2015 | Myrah | G06F 13/32 |
| 9,191,335 | B2* | 11/2015 | Henry | G06F 13/4022 |
| 9,336,171 | B2* | 5/2016 | Kaufmann | G06F 13/385 |
| 9,658,779 | B2* | 5/2017 | Kawakami | G06F 3/06 |
| 9,866,658 | B2* | 1/2018 | Yi | H04L 69/40 |
| 9,959,051 | B2* | 5/2018 | Washiya | G06F 3/0613 |
| 10,037,162 | B2* | 7/2018 | Makida | G06F 3/0685 |
| 2007/0093124 | A1* | 4/2007 | Varney | G06F 11/3409 439/499 |
| 2016/0156532 | A1* | 6/2016 | Huang | H04L 43/0817 709/224 |

* cited by examiner

|  | Current Performance Availability Value | Measured Traffic Value During Connection | Maximum Performance Availability Value |
|---|---|---|---|
|  | 300 KB |  | 300 KB |
| Request Received and Connection Opened | 300 KB | 200 KB | 300 KB |
| Connection Closed and Current Performance Availability Value Updated | 100 KB |  | 300 KB |
| Request Received and Connection Opened | 100 KB | 500 KB | 300 KB |
| Connection Closed and Current Performance Availability Value Updated | -400 KB |  | 300 KB |
| Request Received and Request to Open Connection Rejected | -400 KB |  | 300 Kb |
| Current Performance Availability Value Updated Following Predetermined Time Period | -100 KB |  | 300 KB |
| Current Performance Availability Value Updated Following Predetermined Time Period | 200 KB |  | 300 KB |
| Request Received and Connection Opened | 200 KB | 200 KB | 300 KB |
| Connection Closed and Current Performance Availability Value Updated | 0 KB |  | 300 KB |
| Request Received and Connection Opened | 0 KB | 100 KB | 300 KB |
| Connection Closed and Current Performance Availability Value Updated | -100 KB |  | 300 KB |
| Request Received and Request to Open Connection Rejected | -100 KB |  | 300 KB |

FIG. 3

| | Device 1 - 6GB HDD | | | Device 2 - 12GB SSD | | |
|---|---|---|---|---|---|---|
| | Current Performance Availability Value | Measured Traffic During Connection | Maximum Performance Availability Value | Current Performance Availability Value | Measured Traffic During Connection | Maximum Performance Availability Value |
| 405 | 300 KB | | 300 KB | 100 IOPS | | 100 IOPS |
| 410 — Request Received for Device 1 and Device 2 and Connections Opened | 300 KB | 16 KB | 300 KB | 100 IOPS | 100 IOPS | 100 IOPS |
| 415 — Connection Closed and Current Performance Availability Value Updated | 284 KB | | 300 KB | 0 IOPS | | 100 IOPS |
| 420 — Current Performance Availability Value Updated Following Predetermined Time Period | 300 KB | | 300 KB | 100 IOPS | | 100 IOPS |
| 425 — Request Received for Device 1 and Device 2 and Connections Opened | 300 KB | 512 KB | 300 KB | 100 IOPS | 200 IOPS | 100 IOPS |
| 430 — Connection Closed and Current Performance Availability Value Updated | -212 KB | | 300 KB | -100 IOPS | | 100 IOPS |
| 435 — Request Received for Device 1 and Device 2 and Request to Open Connection Rejected | -212 KB | | 300 KB | -100 IOPS | | 100 IOPS |
| 440 — Current Performance Availability Value Updated Following Predetermined Time Period | 88 KB | | 300 KB | 0 IOPS | 300 IOPS | 100 IOPS |

SYSTEM AND METHOD FOR CONTROLLING THE PERFORMANCE OF SERIAL ATTACHED SCSI (SAS) TARGET DEVICES

BACKGROUND OF THE INVENTION

A serial attached SCSI (SAS) architecture defines a serial device interconnect and a transport protocol that specifies rules for information exchange between devices. The devices may include, for example, servers, operating systems, Hard Disk Drives (HDDs), Solid State Drives (SSDs), without limitation. An SAS controller, containing one or more SAS ports, is capable of establishing a path between an SAS initiator port at the SAS controller and an SAS target port at an I/O device, such as an HDD or an SSD. In order for an SAS controller to establish communication paths with multiple I/O devices, an SAS expander may be positioned between the SAS controller and the I/O devices. The SAS expander enables connections between a port of the SAS controller and multiple I/O ports by routing connections between the expander ports.

Target devices in an SAS domain may include both buffered drives and un-buffered drives. When buffered drives are mixed with un-buffered drives in the same SAS domain, connections to the un-buffered drives may result in starvation of the buffered drives. When the buffering feature is enabled, as in a buffered drive, the buffered drive transfers a fewer number of frames per SAS connection than an un-buffered drive because the number of frames transferred per SAS connection is governed by the buffer size designated in the PHY layer. For example, for a 128 KB size I/O (128 1K data frames), a buffered drive may transfer 23 frames in each connection until all of the 128 data frames are transferred. In contrast, an un-buffered drive would transfer all of the 128 data frames in a single connection. As such, un-buffered drives will complete the data transfer faster than the buffered drive because it is only necessary for the un-buffered to arbitrate and connect once, whereas the buffered drive must arbitrate and connect multiple times to complete the data transfer.

In addition, in the SAS protocol, data transfer occurs between an initiator and a target device when connections are established between the two devices. The establishment of the connections are governed by SAS arbitration rules, which are dominated by Arbitration Wait Time (AWT) values, initialized at zero for a new connection. The number of frames that are transferred during a connection from/to a particular drive, is dependent upon the SCSI I/O size and the outstanding number of commands. For example, a large 128 KB size I/O may transfer up to 128 KB of data in one connection, whereas a 4 KB size I/O would only transfer 4 KB of data. Thus, to transfer 128 KB of data, the device having a 128 KB size I/O would require only a single connection, whereas the device having a 4 KB size I/O would require 32 connections. SSDs are normally used for small size I/O accesses, whereas HDDs are normally used for larger size I/O access. As such, an SAS domain that includes a mix of different sizes and types of drives (i.e. 22.5G/12G/6G SSDs/HDDs) may result in an effect similar to the buffering starvation effect described above.

Input/output operations per second (IOPS) of the SAS drives is one important aspect of an SAS domain. For some SAS applications, it is required that the operating temperature of the unit containing the SAS drives be maintained below a specific temperature. Since the IOPS of the SAS drives effects the operating temperature of the unit, it is desirable to be able to control the IOPS to the SAS drives, thereby managing the operating temperature of the SAS unit housing the SAS drives.

Quality of Service (QoS) is another important aspect of an SAS domain employing an SAS protocol. The performance of the I/O target devices in the SAS domain affects the QoS, however, the SAS protocol does not define a QoS feature other than providing for fairness among I/O target devices, on a connection basis. As such, if different types of drives, such as 22.5G SSDs and 6G HDDs, are mixed in a Just Bunch of Drives (JBODs) connected to the SAS expander, the HDDs may be allowed to utilize a higher percentage of the SAS link than the SSDs, thereby starving the connection with the SSDs, which results in an undesirable lower performance for the SSD devices.

Accordingly, what is needed in the art is an improved system and method for controlling the performance of target devices in an SAS topology.

SUMMARY OF THE INVENTION

In various embodiments, the present invention provides a system and method for controlling the performance of target devices in a Serial Attached SCSI (SAS) domain. In various embodiments, the present invention provides a system and method for controlling the performance of target devices based upon the bandwidth or input/output operations per second (IOPS) of the traffic between an SAS expander and the target devices.

In one embodiment, a method for controlling the performance of a target device is provided which includes, receiving a connection request for a target device of a plurality of target devices coupled to the SAS expander, wherein the target device comprises a maximum performance availability value. The method further includes, determining a current performance availability of the target device, wherein the current performance availability value of the target device is less than or equal to the maximum performance availability value of the target device, and determining if the current performance availability value of the target device indicates that the target device has availability to service the connection request. The method continues by accepting the connection request for the target device if the current performance availability value of the target device indicates that the target device does have availability to service the connection request or rejecting the connection request for the target device if the current performance availability value of the target device indicates that the target device does not have availability to service the connection request.

If the connection request for the target device is accepted, the method further includes, opening a connection between the SAS expander and the target device, measuring traffic between the SAS expander and the target device during the connection to determine a measured traffic value, closing the connection between the SAS expander and the target device and updating the current performance availability value of the target device by reducing the maximum performance availability value of the target device by the measured traffic value. Additionally, if the SAS expander receives a next connection request for the target device, the method further includes, repeating, determining if a current performance availability value of the target device indicates that the target device does or does not have availability to service the next connection request and accepting or rejecting the next connection request as indicated by the performance availability value of the target device. Alternatively, if the SAS expander does not receive a next connection request for the target device, the method further includes, until the next connection request for the target device is received, updating the current performance availability value of the target device after a predetermined time period by increasing the current performance availability value of the target device by the maximum performance availability value of the target device up to the maximum performance availability value of the target device.

If a connection request for the target device is rejected, the method further includes, updating the current performance availability value of the target device after a predetermined time period by increasing the current performance availability value of the target device by the maximum performance availability value of the target device up to the maximum performance availability value of the target device. Additionally, if the SAS expander receives a next connection request for the target device, the method further includes, repeating, determining if a current performance availability value of the target device indicates that the target device has availability to service the next connection request and accepting or rejecting the next connection request as indicated by the performance availability value of the target device. Alternatively, if the SAS expander does not receive a next connection request for the target device, the method further includes, until the next connection request for the target device is received, updating the current performance availability value of the target device after a predetermined time period by increasing the current performance availability value of the target device by the maximum performance availability of the target device up to the maximum performance availability of the target device.

In an additional embodiment, a system for controlling the performance of one or more target devices includes, a serial attached SCSI (SAS) expander configured to receive a connection request for a target device of a plurality of target devices coupled to the SAS expander, wherein the target device comprises a maximum performance availability value. The system further includes, a resolver of the SAS expander, the resolver configured to determine a current performance availability of the target device, wherein the current performance availability value of the target device is less than or equal to the maximum performance availability value of the target device and to determine if the current performance availability value of the target device indicates that the target device has availability to service the connection request. The resolver is further configured to accept the connection request for the target device if the current performance availability value of the target device indicates that the target device does have availability to service the connection request and to reject the connection request for the target device if the current performance availability value of the target device indicates that the target device does not have availability to service the connection request.

Accordingly, in various embodiments, the present invention provides an improved system and method for controlling the performance of target devices in an SAS topology. The present invention provides a solution for the buffering starvation problems associated with mixed buffered topologies and drives having different performance attributes being controlled by an SAS expander.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications, and equivalents, which may be included within the spirit and scope of the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with various embodiments of the present invention, an improved system method for controlling the performance of target devices. More specifically, the invention provides a system and method for controlling the performance of target devices based upon the bandwidth or input/output operations per second (IOPS) of the traffic between a SAS expander and the target devices.

Figure 1:
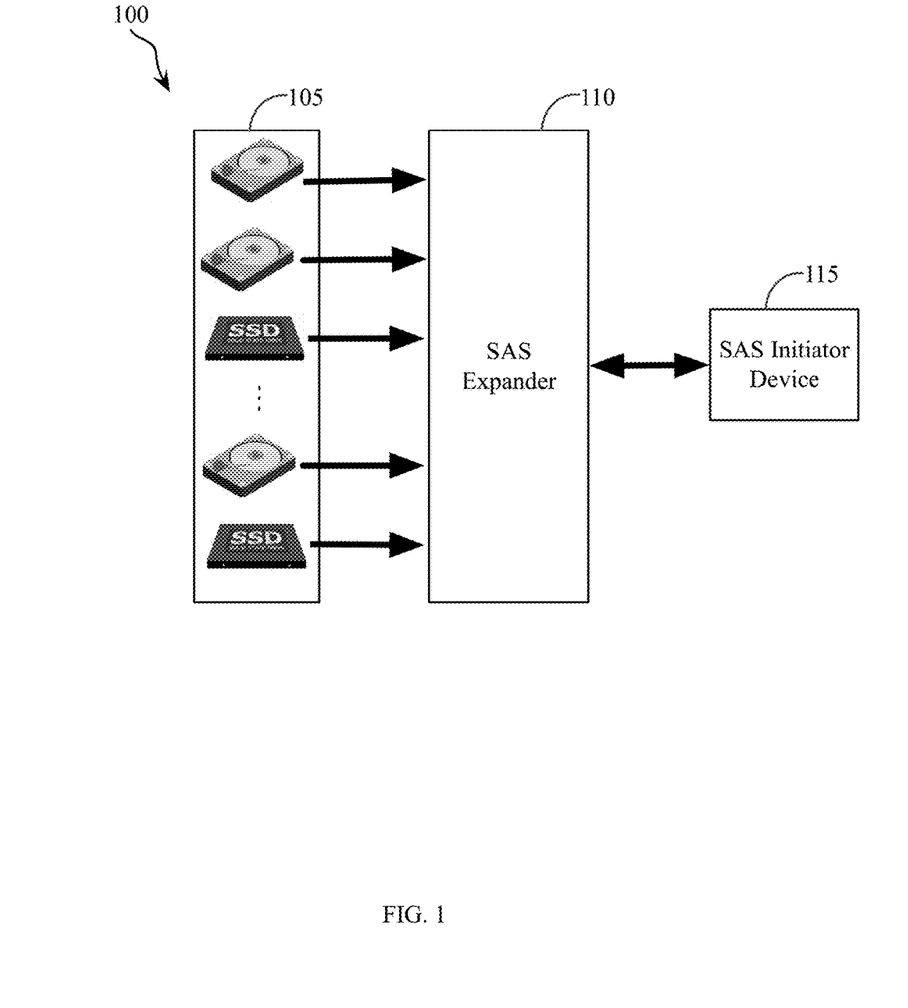
FIG. 1 is a block diagram of a system for controlling the performance of target devices, in accordance with an embodiment of the present invention.

As shown in FIG. 1, in the present invention an SAS domain 100 may include a plurality of target devices 105 in communication with an SAS expander 110 and an SAS initiator device 115 in communication with the SAS expander 110. The target devices 105 may include one or more Hard Disk Drives (HDDs), one or more Solid State Drives (SSDs), or any number of other mass storage devices known in the art. The HDDs and SSDs may be buffered or unbuffered. A buffered HDD or SSD has a buffering feature enabled on the PHY layer and on the SAS port where the HDD/SSD is connected. In contrast, an unbuffered HDD or SSD has a buffering feature disabled on the PHY layer and on the SAS port where the HDD/SSD is connected. In addition, the HDDs and the SSDs may be of various types and various sizes.

In various embodiments, the SAS expander 110 of the present invention is capable of controlling the performance of the plurality of target devices 105 by measuring the traffic between the SAS expander 110 and the target devices 105 and accepting or rejecting connection requests by an initiator, such as the SAS initiator device 115, to achieve a desired performance of the target devices 105. The SAS expander 110 may be considered to be a switch having a set of expander ports and logic that implements part of an SAS protocol. The switch enables multiple point-to point-connections to be made between the SAS initiator device 115 and the target devices 105 and aggregates the multiple SAS devices into the SAS domain 100.

Figure 2:
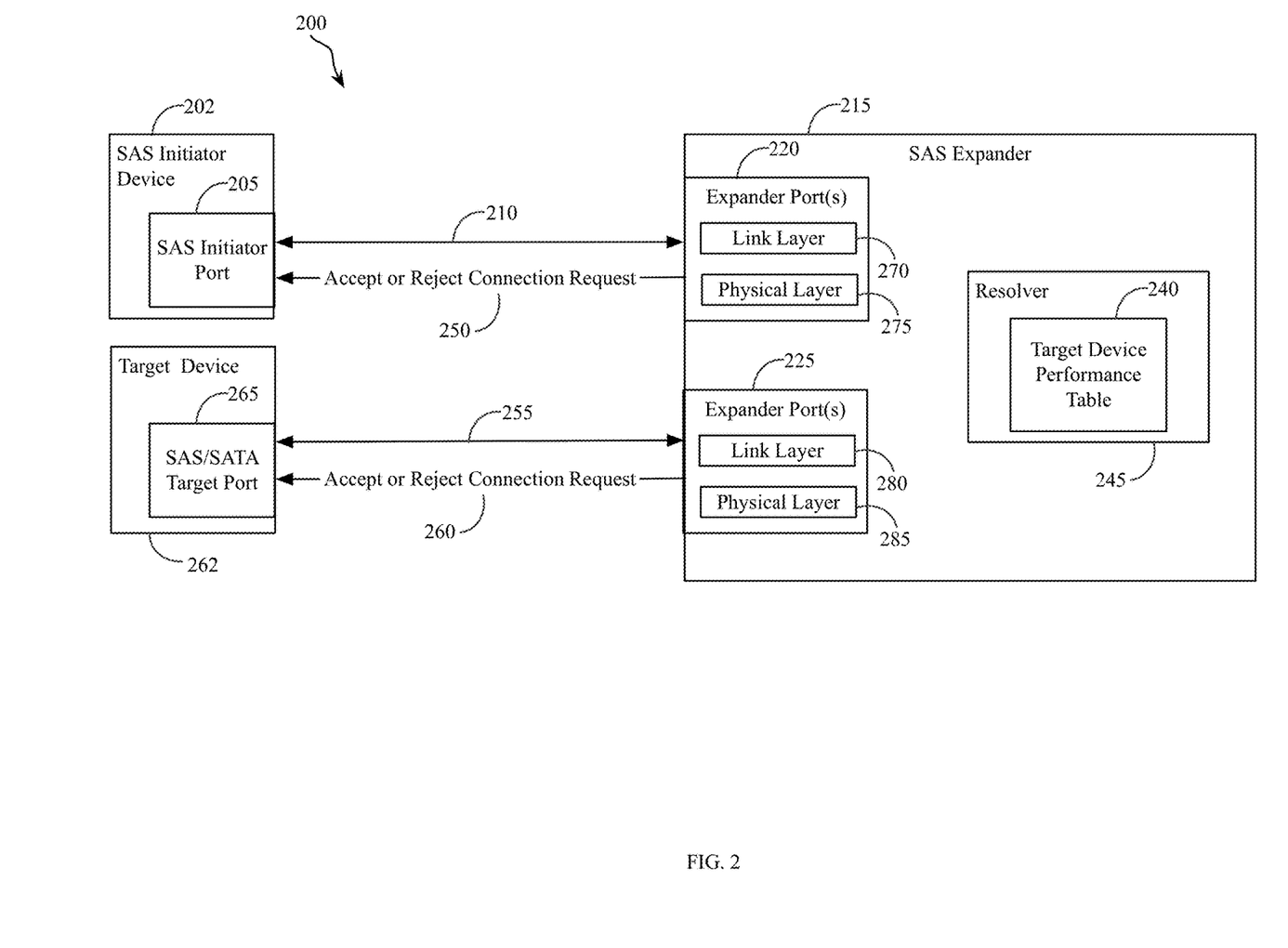
FIG. 2 is a detailed block diagram of a system for controlling the performance of target devices, in accordance with an embodiment of the present invention.

With reference to FIG. 2, in one embodiment an SAS domain 200 may include an SAS expander 215, one or more SAS initiator devices 202, having one or more SAS initiator ports 205, and one or more SAS/SATA (Serial AT Attachment) target devices 262 having one or more SAS/SATA (Serial AT Attachment) target ports 265. While one SAS initiator device 202 having one initiator port 205 and one SAS/SATA target device 262 having one SAS/SATA target ports 265 are illustrated in this embodiment, this is not intended to be limiting and multiple initiator devices with multiple initiator ports and multiple target devices with multiple target ports may be in communication with the SAS expander 215.

In general, an initiator device is a device that originates device service and task management requests for processing by a target device. An initiator device also receives responses for similar requests from other target devices. In various embodiments, initiator devices may be provided as an on-board component of a motherboard or, alternatively, as an add-on host bus adapter.

A target device is known to contain logical units and target ports that receive device service and task management requests for processing from initiator devices. The target device additionally sends responses to the requests back to the initiator devices. In various embodiments, a target device may be a HDD, an SSD, or any other mass storage device known in the art.

The SAS expander 215 of the present invention includes a first expander port 220, a second expander port 225 and a resolver 245. The expander ports 220, 225 include at least a link layer 270, 280 and a physical layer 275, 285. In general, SAS protocols includes four layers: a PHY layer, a link layer, a port layer, and a transport layer. In implementing these four layers at an SAS port, the transport layer is responsible for encapsulating, without limitation, commands, data and status into SAS frames or data packets and for assigning them to the port layer. The port layer is responsible for receiving packets from the transport layer and for sending messages to the link layer to establish connections between devices and between one or more PHYs. The link layer facilitates controlling the PHY layer for connection management between devices, and the PHY layer includes transceivers which facilitate connections to physical interfaces for sending and/or receiving signals. As such, the physical layer 275, 285 of the expander ports 220, 225 is responsible for defining the electrical and physical characteristics of the expander ports and for providing for the differential signaling transmission of the communication signal between the expander ports 220, 225 and the device ports 205, 265. The link layer 270, 280 of the expander ports 220, 225 is responsible for opening and closing connections between the expander ports 220, 225 and the device ports 205, 265. The first expander port 220 of the SAS expander 215 is coupled to the SAS initiator port 205 of the SAS initiator device 202 over a first communication cable 210 and the second expander port 225 of the SAS expander 215 is coupled to the target port 265 of the target device 262 over a second communication cable 255.

In the SAS protocol, data transfer between devices occurs when connections are established between two devices, such as between SAS initiator device 202 and a target device 262. The connection between the devices is established when a target device 262 responds to a connection request from the SAS initiator device 202 by accepting the connection request. More specifically, a connection is established between an SAS initiator device 202 and a target device 262 when the SAS initiator device 202 sends a connection request in the form of an OpenAddr frame to the SAS address of the target device 262 and the target device 262 responds by sending an OpenAccept primitive sequence back to the SAS initiator device 202. Alternatively, the target device 262 may respond to the connection request by sending an OpenReject(Retry) (ORR) primitive sequence, thereby rejecting the connection request from the SAS initiator device 202 and a connection will not be established between the target device 262 and other devices in the SAS topology may use the SAS link. In addition to sending an ORR sequence to reject the connection request, an ORR delay may also be included with the rejection. The ORR delay may be a static value defined by firmware. In a specific embodiment, the larger the difference between a current performance availability value and a maximum performance availability value, the larger the ORR delay.

In order to provide performance control of the target devices 262, an SAS initiator device 202 coupled to the SAS expander 215 must first identify each of the target devices 262. During power-up of the SAS fabric and the SAS initiator device 202, the SAS initiator device 202 discovers all of the target devices 262 present in the SAS topology. The SAS initiator device 202 is therefore aware of the performance capability of the target devices 262 and as such, the SAS initiator device 202 knows if the target devices 262 in the SAS topology are SSDs, which exhibit high performance data transmission, or HDDs, which have rotating media and thereby exhibit a lower performance data transmission than the SSDs. The SAS initiator device 202 is also aware of whether or not the target devices 262 are buffered or unbuffered. Based upon the specific application, the SAS initiator device 202 can determine whether or not the performance of the target devices 262 need to be controlled. The SAS initiator device 202 may decide that it is necessary to control the performance of certain drive types or a subset of drives within the drive types.

For example, if an SAS initiator device 202 is connected to 20 HDDs and 2 SSDs through an SAS expander 215, the SAS initiator device 202 may decide that a specific application requires that each of the SSDs be allowed to operate at full throughput and each of the HDDs be restricted to 140 MB/s throughput. As such, the SAS initiator device 202 will need to control the performance of the HDDs to restrict the throughput to 140 MB/s. In this exemplary embodiment, the full throughput of each of the SSDs is determined to be 1000 MB/s and a random IOPS of 100 K. In addition, the full throughput of each of the HDDs is determined to be 300 MB/s and a sequential IOPS of 20 K. In accordance with the SAS Protocol Layer-4 specification, an SAS port having a single lane (Tx/Rx pair) PHY is referred to as a narrow port and an SAS port including more than one narrow port is considered to be a wide port. Assuming that there are 4 PHYs in a wide port of the SAS expander, and assuming an SAS link rate of 12 Gbps, after applying an 8b/10b conversion and transformation from bit to byte format, the ideal bandwidth per PHY will be 1.2 GB/s, providing for a total bandwidth for the wide port of 4800 MB/s.

Assuming that the IOPS of the SAS initiator device 202 per PHY is 350 K, the total IOPS of the wide port will be 1400 IOPS. As such, the 20 HDDs operating at full throughput will provide a total bandwidth of 6000 MB/s and a 400 K sequential IOPS and the 2 SSDs operating at full throughput will provide a total bandwidth of 2000 MB/s and a 200 K random IOPS. Operating both the 20 HDDs and the 2 SSDs at full throughput there provides a total drive bandwidth of 8000 MB/s and a total drive IOPS of 600 K. Assuming that the maximum IOPS of the SAS initiator device 202 is greater than the total IOPS of all the devices and that the maximum throughput of the SAS initiator device 202 is less than the total throughput of all the devices, the maximum throughput available is limited by the total 4800 MB/s bandwidth of the wide port.

Accordingly, the SAS initiator device 202 will determine that 2000 MB/s of the 4800 MB/s total bandwidth should be provided by the 2 SSDs operating at 1000 MB/s each and the remaining 2800 MB/s bandwidth should be provided by the 20 HDDs, wherein each of the 20 HDDs operates at a 140 MB/s bandwidth. As such, in the exemplary embodiment, the SAS initiator device 202 determines that the performance of the 20 HDDs should be controlled such that each of the 20 HDDs operates at a 140 MB/s bandwidth. In the present invention, the 140 MB/s bandwidth limitation for the HDDs is referred to as the maximum performance availability value of the target device. With reference again to FIG. 1, in general, the maximum performance availability value of each of the target devices of the plurality of target devices 105 coupled to the SAS expander 110 is determined by the SAS initiator device 115 and provided to the SAS expander 110 of the present invention. After the SAS initiator device 115 determines the maximum performance availability value of each of the target devices of the plurality of target devices 105 that are to have their performance controlled, the SAS initiator device 115 provides the values to the SAS expander 110.

With reference to FIG. 2, in the present invention, an SAS expander 215 further includes a resolver 245 which comprises a target device performance table 240. The SAS initiator device 202 determines the maximum performance availability values for each of the target devices 262 to be controlled and the SAS expander 215 stores the maximum performance availability values for each of the target devices in the target device performance table 240 of the resolver 245.

In the present invention, the SAS expander 215 is operated to control the performance of one or more target devices. In operation, when the SAS expander 215 receives a connection request from an SAS initiator device 202 designating a target device 262 of the plurality of target devices coupled to the SAS expander 215, the resolver 245 of the SAS expander 215 first determines a current performance availability value of the target device 262. The current performance availability value of the target device 262 is dependent upon the measured traffic value during previous connections to the target device 262 and the maximum performance availability value of the target device 262. The SAS expander 215 determines whether or not to allow connections between the SAS initiator device 202 and the target device 262 based upon the current performance availability value of the target device 262, notifies the SAS initiator device 202 of the status of the connection request 250 and notifies the target device 262 of the status of the connection request 260. The SAS expander 215 monitors the traffic between the SAS initiator device 202 and the target device 262 during connections and updates the current performance availability value of the target device 262, thereby controlling the performance of the target device.

In an additional embodiment, the target device 262 may be configured to generate a connection request for another target device to be controlled by the SAS expander 215.

Figure 3:
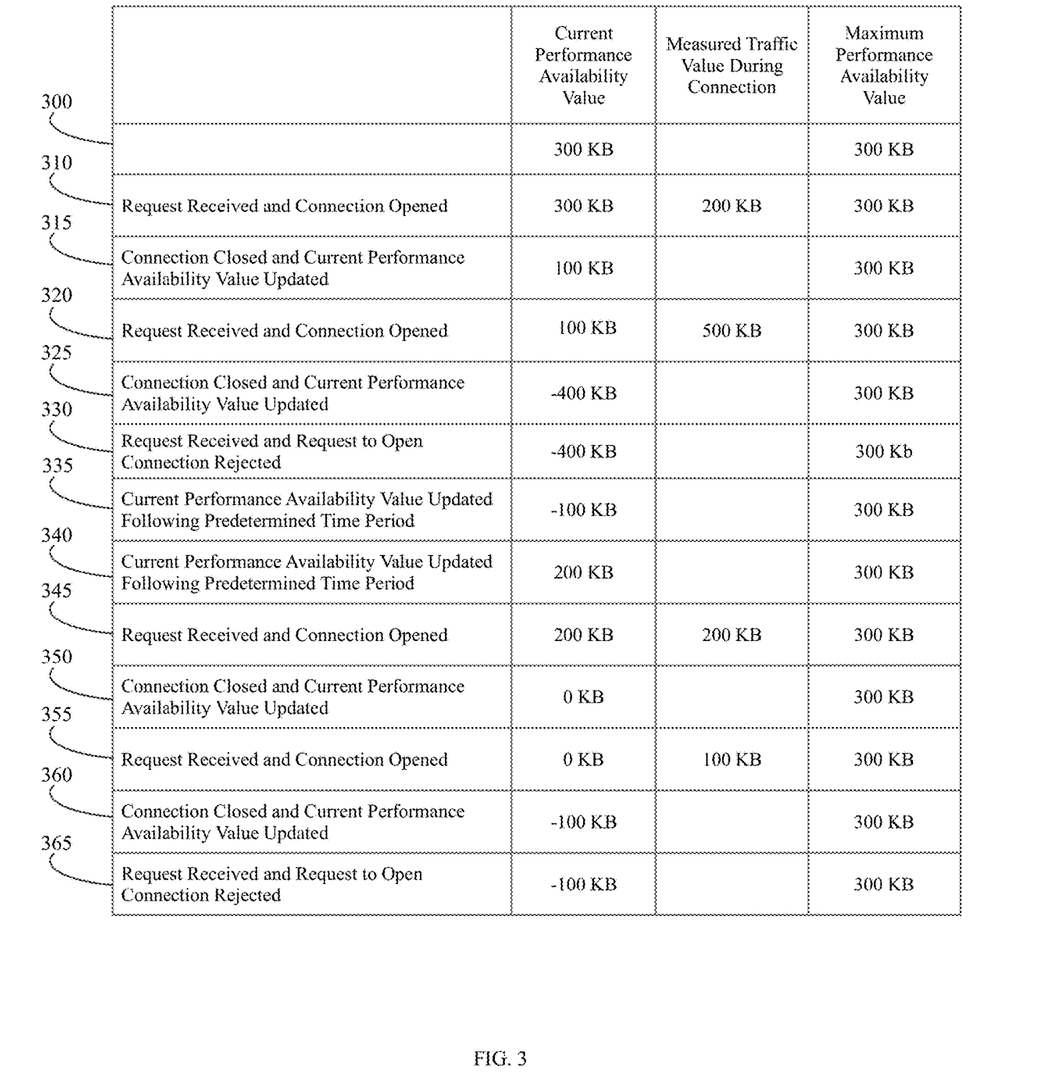
FIG. 3 is a table illustrating a first exemplary embodiment for controlling the performance of a single target device, in accordance with an embodiment of the present invention.

With reference to FIG. 3, in an exemplary embodiment for determining the current performance availability value 300 of a target device, the maximum performance availability value for the target device is provided to the SAS expander 215 and stored in the target device performance table 240 of the resolver 245. In the present invention, the maximum performance availability value represents the maximum performance that can be achieved by the target device 262 in accordance with requirements of the SAS initiator device 202 and the current performance availability value represents the excess or deficit performance availability of the target device 262. As such, the current performance availability value of the target device 262 indicates whether or not the target device 262 has availability to service a connection request, wherein an excess performance availability indicates that the target device 262 has availability to service a connection request and a deficit performance availability indicates that the target device 262 does not have availability to service the connection request. In one embodiment, a current performance availability value greater than a predetermined threshold value may indicate an excess performance availability of the target device 262, thereby allowing the target device 262 to service the connection request. Alternatively, a current performance availability value below the predetermined threshold value may indicate a deficit performance availability of the target device 262, and the target device 262 will be unable to service the connection request. The current performance availability value of the target device 262 is continuously updated and stored in the target device performance table 240 of the resolver 245.

In this exemplary embodiment, the maximum performance availability value of the target device 262 has been determined by the SAS initiator device 202 during the start-up process to be 300 KB. At 300, prior to a first connection with the target device 262, the current performance availability value of the target device 262 is equal to the maximum performance availability value of the target device 262.

At 310, when a first request for a connection to the target device 262 is received from an SAS initiator device 202, the resolver 245 of the SAS expander 215 determines whether or not the current performance availability value of the target device 262 indicates that the target device 262 has availability to service the connection request. In other words, the resolver 245 determines whether or not the current performance availability value of the target device 262 is above or below a predetermined threshold value. In this embodiment, the predetermined threshold value is equal to zero. As such, since the current performance availability value of the target device 262 is equal to 300 KB, which is not less than zero, the resolver 245 instructs the SAS expander 215 to open a connection between the SAS initiator device 202 and the target device 262 and the current performance availability value for the target device 262 is 300 KB. The link layer 270, 280 of the SAS expander 215 then measures the traffic during the connection to determine a measured traffic value. In this embodiment, the measured traffic value during the first connection is 200 KB.

At 315, when the transfer has completed and the first connection is closed, the resolver 245 updates the current performance availability value of the target device 262 by decreasing the previous current performance availability by the measured traffic value, i.e. by 200 KB, resulting in a current performance availability value for the target device of 100 KB.

At 320, when a second connection request is received at the SAS expander 215, the resolver determines if the current performance availability value of the target device 262 is above the predetermined threshold value of zero, thereby indicating that the target device 262 does have availability to service the connection request. In this embodiment, at 320, the current performance availability value of the target device 262 is 100 KB, which is above the predetermined threshold value of zero, so it is determined that the target device 262 has availability to service the connection request, the request is accepted and a connection is opened between the SAS initiator device 202 and the target device 262.

At 320, the traffic measured by the link layer 270, 280 of the SAS expander 215 during the connection is 500 KB. At 325, the connection between the SAS initiator device 202 and the target device 262 is closed and the current performance availability value is updated at the resolver 245 by decreasing the previous current performance availability value of 100 KB by the measured traffic value of 500 KB, resulting in an updated current performance availability value of −400 KB.

At 330, a third connection request is received at the SAS expander 215 and the resolver 245 determines that the current performance availability value of the target device 262 indicates that the target device 262 does not have availability to service the connection request because the current performance availability value of the target device 262 is −400 KB, which is below the predetermined threshold of zero. As a result, the resolver 245 instructs the SAS expander 215 to reject the connection request and a connection is not opened between the SAS initiator device 202 and the target device 262.

At 335, because a connection was not opened in response to the third connection request, no traffic is flowing between the SAS initiator device 202 and the target device 262. When a connection request is rejected and a connection is not opened between the devices, the resolver 245 updates the current performance availability value of target device 262 by increasing the previous performance availability value by the maximum performance availability value of the target device 262, following a predetermined time period. As such, at 335, the resolver 245 updates the current performance availability value of the target device 262 by adding the maximum performance availability value of 300 KB to the previous current performance availability value of −400 KB, resulting in an updated current performance availability value of −100 KB. The predetermined period of time may be predetermined and be set to one of a number of values, including but not limited to 500 µs, 1 ms, 2 ms or 4 ms.

At 340, if a next connection request is received at the SAS expander 215, the next connection request for the target device 262 is again rejected because the current performance availability value of the target device 262, which is −100 KB, is still below the predetermined threshold of zero, thereby indicating that the target device 262 does not have availability to service the connection request. Following a next predetermined time period the current performance availability of −100 KB is updated by adding the maximum performance availability value of 300 KB, resulting in an updated current performance availability value of the target device 262 to be 200 KB.

At 345, a fourth connection request is received at the SAS expander 215. The resolver 245 determines that the current performance availability value is 200 KB, which is above the predetermined threshold value of zero, thereby indicating that the target device 262 has availability to service the connection request. As such, the resolver 245 instructs the SAS expander 215 to open a connection between the SAS initiator device 202 and the target device 262 and a link layer 270, 280 of the SAS expander 215 measures the traffic during the connection.

At 350, the fourth connection is closed and the resolver 245 updates the current performance availability value of the target device 262 by reducing the previous current performance availability value by the measured traffic value of 200 KB resulting in a current performance availability value of 0 KB.

It follows that the fifth connection request received for the target device 262 at 355 will be accepted and the current performance availability value of the target device 262 will be updated to −100 KB at 360 as a result of the 100 MKB traffic flow measured during the connection at 355. The resulting −100 KB current performance availability value at 360 will result in the rejection of the subsequent connection request received at the SAS expander 215 at 365.

As illustrated with reference to FIG. 2, the SAS expander 215, the resolver 245 and the target device performance table 240 of the resolver work 245 in combination to control the performance of the target device 262. In general, the SAS expander 215 monitors the traffic during the connections between the SAS initiator device 202 and the target device 262 and the resolver 245 determines whether or not the target device 262 has availability to service a next connection request based upon the measured traffic values during previous connections and the maximum performance availability value assigned by SAS initiator device 115.

As such, in accordance with the present invention, when the SAS expander 215 responds to the SAS initiator device 202 by rejecting the connection request because the current performance availability is below a predetermined threshold value, a connection between the SAS initiator device 202 and the target device 262 is not established and commands and data frames will not be transferred between the devices. As the SAS expander 215 updates the current performance availability value based upon the maximum performance availability following every predetermined time period, the current performance availability value will eventually be above the predetermined threshold value and over a period of time, the average performance of the target device will be equal to the maximum performance availability value of the target device 262.

Figure 4:
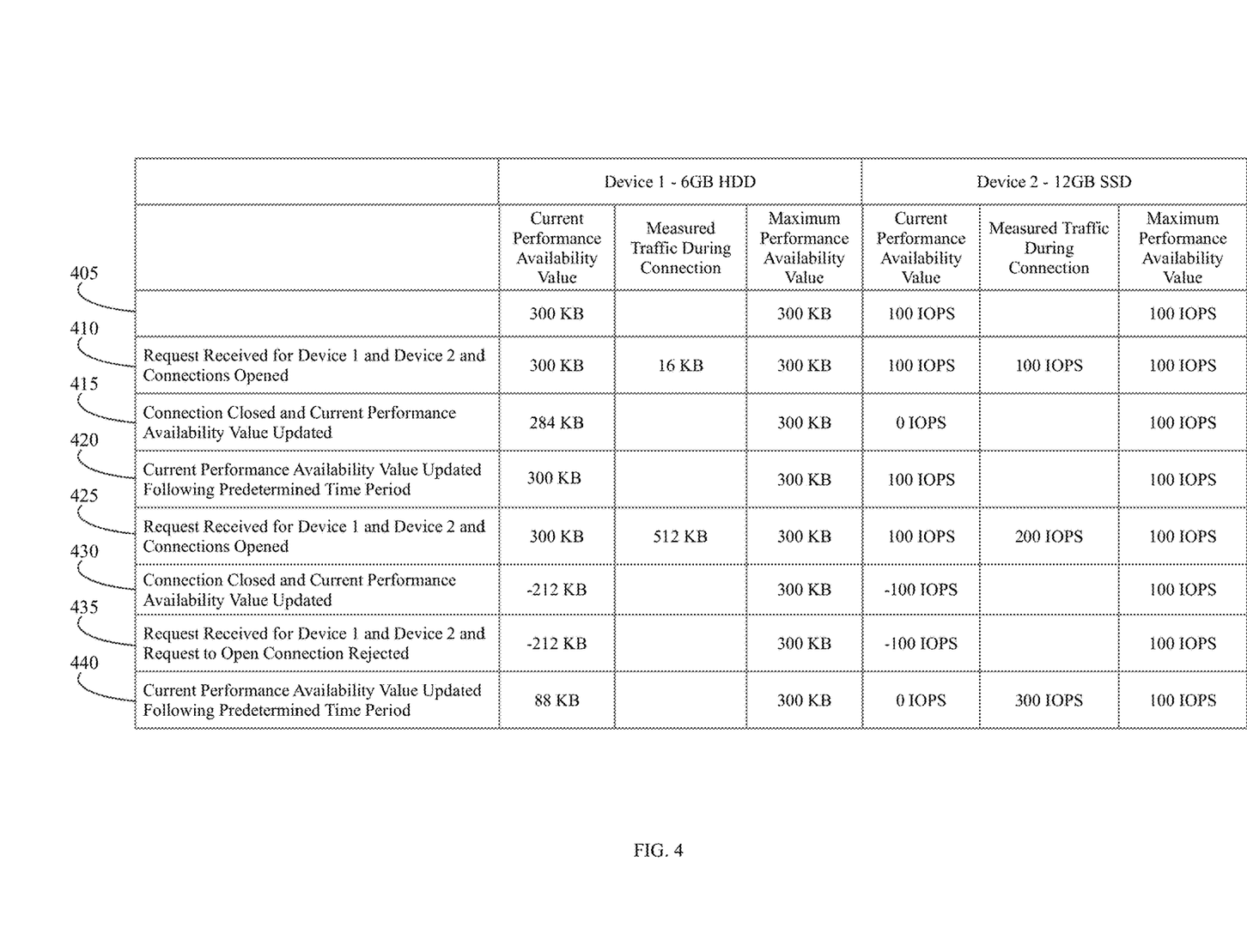
FIG. 4 is a table illustrating a second exemplary embodiment for controlling the performance of two different target devices, in accordance with an embodiment of the present invention.

In an additional illustrative embodiment shown with reference to FIG. 4, the SAS expander 215, the resolver 245 of the SAS expander 215 and the target device performance table 240 of the resolver 245 may operate in combination to control the performance of two or more target devices. In this embodiment, the target devices include a 6 GB HDD (Device 1) and a 12 GB SSD (Device 2). At 405, assuming that the SAS initiator device 115 has determined during a start-up procedure that the maximum performance availability value of the HDD is 300 KBps and the maximum performance availability value of the SSD is 100 IOPS. As such, at 405, the current performance availability value of the HDD is 300 KBps and the current performance availability value of the SSD is 100 IOPS. Measuring the performance availability value of the HDD in KBps and the performance availability of the SSD in IOPS is exemplary and in other embodiments the performance availability of the HDD and/or the SSD could be measured in either KBps or IOPS At 410, a connection request is received at the SAS expander 215 for both the HDD and the SSD and a connection is opened for both devices because the current performance availability value of both devices is above a predetermined threshold value, which is this exemplary embodiment is zero. During the connections, the measured traffic value for the HDD is 16 KBps and the measured traffic value for the SSD is 100 IOPS. In order to measure the IOPS of the SSD, the link layer of the SAS expander 215 includes logic configured to measure the commands per second (CMDs) passing through the SAS expander 215.

At 415, the current availability performance value for the HDD is updated by the resolver 245 to 284 KBps and the current availability performance value for the SSD is updated by the resolver 245 to 0 IOPS by reducing the previous current availability performance values by the measured traffic values of 16 KBps and 100 IOPS, respectively.

At 420, since a next connection has not been received, the resolver 245 updates the current performance availability value of each of the target devices 262 following a predetermined time period. Assuming a predetermined time period of 1 ms, the resolver 245 updates the current performance availability value of the HDD by adding the maximum performance availability value of the HDD to the previous performance availability value of the HDD, up to the maximum performance availability value, resulting in a current performance availability of the HDD of 300 KB. The resolver 245 also updates the current performance availability value of the SSD by adding the maximum performance availability value of the SSD to the previous performance availability value of the SSD, up to the maximum performance availability value, resulting in a current performance availability of the HDD of 100 IOPS.

At 425, a second connection request is received at the SAS expander 215 for both the HDD and the SSD and a connection is opened for both devices because the current performance availability value of both devices is above the predetermined threshold of zero, thereby indicating that both the HDD and SSD devices have availability to service the connection request. During the connections, the measured traffic value for the HDD is 512 KB and the measured traffic value for the SSD is 200 IOPS.

At 430, the current availability performance value for the HDD is updated by the resolver 245 to −212 KB and the current availability performance value for the SSD is updated by the resolver 245 to −100 IOPS by reducing the previous current availability performance values by the measured traffic values of 512 KB and 200 IOPS, respectively.

At 435, a third connection request is received at the SAS expander 215 for both the HDD and the SSD. However, the third connection request is rejected by the resolver 245 because the current performance availability value of both devices is no longer above the predetermined threshold value of zero, wherein the current performance availability value of the HDD is −212 KB and the current performance availability value of the SSD is −100 IOPS.

At 440, since the third connection request was rejected by the SAS expander 215, the resolver 245 updates the current performance availability value of each of the target devices 262 following a predetermined time period. Assuming a predetermined time period of 1 ms, the resolver 245 updates the current performance availability value of the HDD by adding the maximum performance availability value of the HDD to the previous performance availability value of the HDD, up to the maximum performance availability value, resulting in a current performance availability for the HDD of 88 KB. The resolver 245 also updates the current performance availability value of the SSD by adding the maximum performance availability value of the SSD to the previous performance availability value of the SSD, up to the maximum performance availability value, resulting in a current performance availability for the HDD of 0 IOPS. Since the current performance availability value of both devices is now above zero, thereby indicating that both devices now have availability to service a connection request, a next connection request received at the SAS expander 215 will be accepted.

Figure 5:
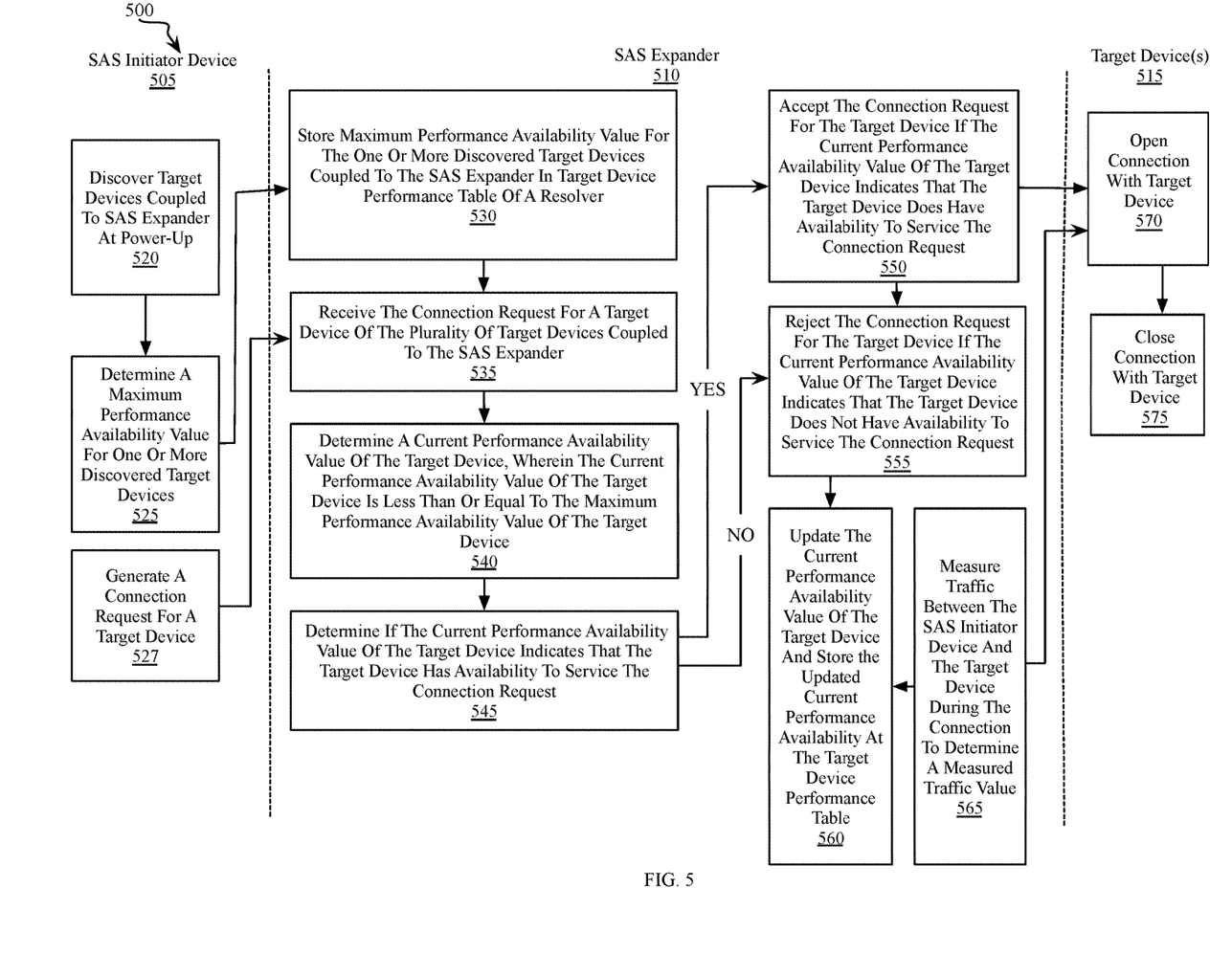
FIG. 5 is a swim diagram illustrating a method for controlling the performance of target devices, in accordance with an embodiment of the present invention.

FIG. 5 is a swim-diagram of an exemplary process 500 for controlling the performance of one or more target devices, in accordance with an embodiment of the present invention. For example, the process 500 can be utilized by an SAS initiator device 505 and implemented by an SAS expander 510 to control the performance of one or more target devices 515. FIG. 5 illustrates lanes for steps that can be performed by an SAS initiator device 505, an SAS expander 510 and one or more target devices 515.

To control the performance of one or more target devices 515, such as HDDs and SSDs, coupled to the SAS expander 510, the SAS initiator device 505 first discovers one or more target devices 515 coupled to the SAS expander 510 during a power-up process of the SAS topology (520). The SAS initiator device 505 then determines a maximum performance availability value for one or more of the target devices 515 which are to have their performance controlled (525). The maximum performance availability values are dependent upon at least the target device type and the requirements of the application being performed by the SAS initiator device 505.

The SAS expander 510 then stores the maximum performance availability for each of the one or more target devices 515 coupled to the SAS expander 510 in a target device performance table of a resolver of the SAS expander 510 (530).

The SAS initiator device 505 may then generate a connection request for a particular target device 515 (527) and the SAS expander 510 may then receive the connection request for particular target device 515 (535). In one embodiment, the SAS initiator device 505 may send a connection request in the form of an OpenAddr frame to the SAS address of the particular target device 515. After the SAS expander 510 has received the connection request, the resolver then determines a current performance availability value of the particular target device 515 identified in the connection request, wherein the current performance availability value of the target device 515 is less than or equal to the maximum performance availability value of the target device 515. As previously described, the maximum performance availability value of the target device 515 represents the maximum performance that can be achieved by the target device 515 in accordance with requirements of the SAS initiator device 505 and the current performance availability value of the target device 515 represents the excess or deficit performance availability of the target device 515.

The resolver of the SAS expander 510 then determines if the current performance availability value of the target device indicates that the target device has availability to service the connection request (545). If the current performance availability value of the target device indicates that the target device has availability to service the connection request, then the resolver instructs the SAS expander 510 to accept the connection request for the target device 515 (550). The SAS expander 510 then opens a connection with the target device 515 (570). In one embodiment, the resolver may instruct the SAS expander 510 to send an OpenAccept sequence back to the SAS initiator device 505 to open a connection between the SAS initiator device 505 and the target device 515. During the connection, the resolver of the SAS expander 510 measures the traffic between the SAS initiator device 505 and the target device 515 to determine a measured traffic value (565). The resolver then updates the current performance availability value of the target device 515 and stores the updated current performance availability in the target device performance table of the resolver (560). Following the transfer of the data between the SAS initiator device 505 and the target device 515, the connection is closed with the target device 515 (575).

Alternatively, if the current performance availability value of the target device indicates that the target device does not have availability to service the connection request, then the resolver instructs the SAS expander 510 to reject the connection request for the target device 515 (555). In one embodiment, the resolver may instruct the SAS expander 510 to send an OpenReject(Retry) sequence to the SAS initiator device 505, thereby rejecting the connection request from the SAS initiator device 505 and a connection will not be established between the SAS initiator device 505 and the target device 515. The resolver then updates the current performance availability value of the target device 515 and stores the updated current performance availability in the target device performance table of the resolver (560).

As such, as illustrated in the swim-diagram of FIG. 5, the SAS expander 510 continuously updates a current performance availability value of one or more target devices 515 based upon measured traffic during connections between the SAS initiator device 505 and the target device 515 and a maximum performance availability value predetermined by the SAS initiator device 505. In this way, the SAS expander 510 controls the performance of one or more of the target devices 515 by limiting the traffic flow between the devices to a maximum performance value.

Figure 6:
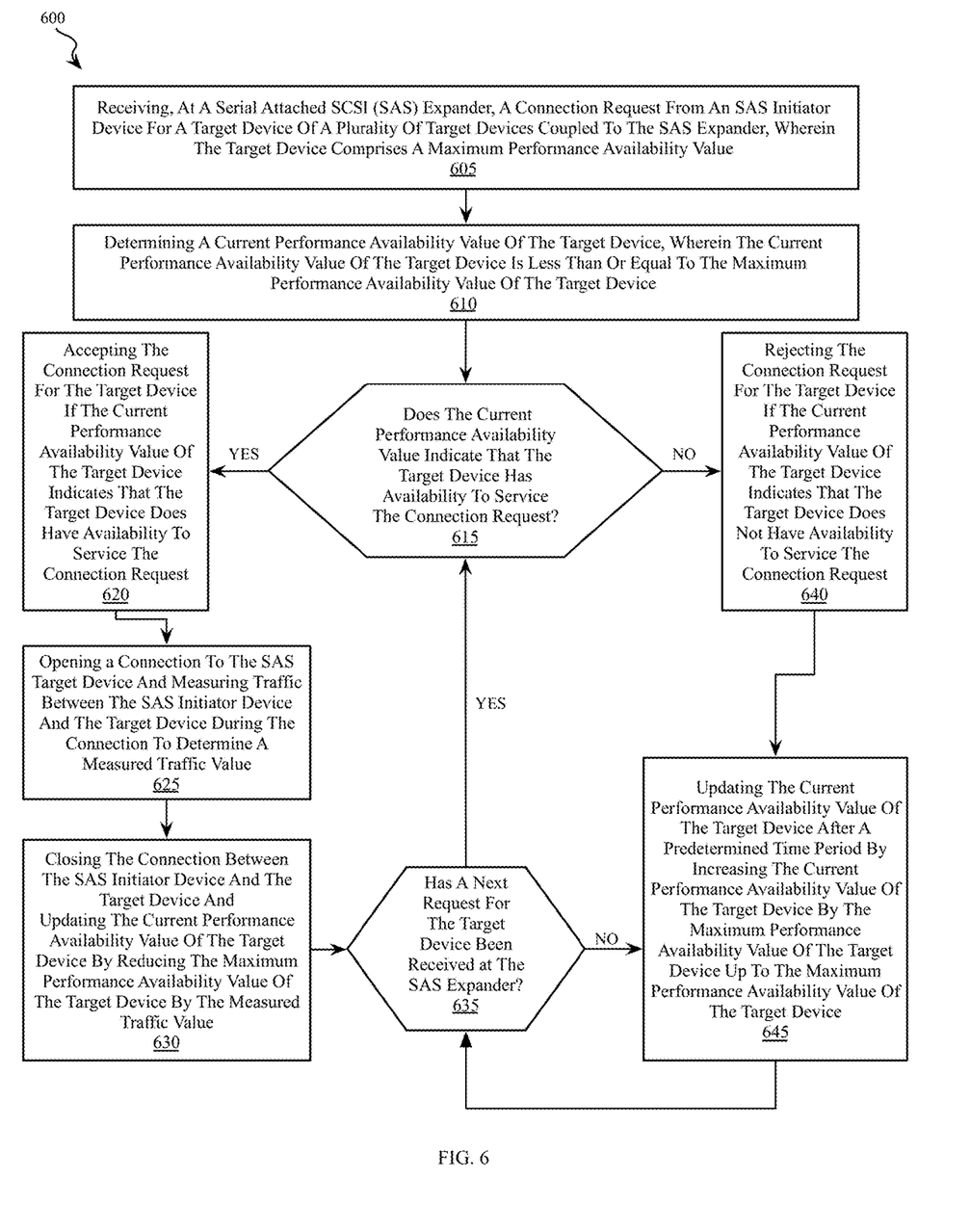
FIG. 6 is a flow diagram illustrating a method for controlling the performance of target devices, in accordance with an embodiment of the present invention.

FIG. 6 is a flow diagram of a method 600 for controlling the performance of target devices, in accordance with an embodiment of the present invention. At operation 605, the method includes receiving, at a Serial Attached SCSI (SAS) Expander, a connection request for a target device of a plurality of target devices, wherein a maximum performance availability value is associated with the target device. With reference to FIG. 2, in the present invention, the SAS expander 215 is configured for receiving the connection request and the SAS initiator device 202 is configured for determining the maximum performance availability value for the target devices 262.

At operation 610, the method includes determining a current performance availability value of the target device 262, wherein the current performance availability value of the target device 262 is less than or equal to the maximum performance availability value of the target device 262. With reference to FIG. 2, in the present invention, the resolver 245 of the SAS expander 215 is configured for determining a current performance availability value of the target device 262.

At operation 615, the method includes determining if the current performance availability value of the target device 262 indicates that the target device 262 has availability to service the connection request. With reference to FIG. 2, in the present invention, the resolver 245 of the SAS expander 215 is configured for determining if the current performance availability value of the target device 262 indicates that the target device 262 does have availability to service the connection request.

If at operation 615 it is determined that the current performance availability value of the target device 262 indicates that the target device 262 has availability to service the connection request, the method continues at operation 620 by accepting the connection request for the target device 262. With reference to FIG. 2, in the present invention, the SAS expander 215 is configured for accepting the connection request for the target device 262.

Following operation 620, after the connection request for the target device 262 has been accepted the method continues at operation 625 by opening a connection to the target device 262 and measuring the traffic at the SAS expander 215 during the connection to determine a measured traffic value. With reference to FIG. 2, in the present invention, the link layer 270, 280 of the SAS expander 215 is configured for measuring the traffic and for determining the measured traffic value for the connection.

Following the completion of the traffic flow in operation 625, the method continues at operation 630 by closing the connection between the initiator device and the target device and updating the current performance availability value of the target device by reducing the maximum performance availability value of the target device by the measured traffic value. With reference to FIG. 2, in the present invention, the resolver 245 of the SAS expander 215 is configured for closing the connection between the SAS initiator device 202 and the target device 262 and updating the current performance availability value of the target device 262 by reducing the maximum performance availability value of the target device 262 by the measured traffic value.

At operation 635, it is determined if a next request for the target device has been received at the SAS expander 215. If a next request for the target device has been received, the method continues at operation 615 and the process continues in a loop through operations 620, 625 and 630 until the SAS expander 215 does not receive a next request for the target device. Alternatively, if a next request for the target device has not been received at the SAS expander 215, the method continues at operation 645 by updating the current performance availability value of the target device 262 after a predetermined time period by increasing the current performance availability value of the target device 262 by the maximum performance availability value of the target device 262 up to the maximum performance availability of the target device 262. With reference to FIG. 2, in the present invention, the resolver 245 of the SAS expander 215 is configured for determining if a next request for the target device 262 has been received at the SAS expander 215 and for updating the current performance availability value of the target device 262 after a predetermined time period by increasing the current performance availability value of the target device 262 by the maximum performance availability value of the target device 262 up to the maximum performance availability of the target device 262.

Alternatively, if at operation 615 it is determined that the current performance availability value of the target device 262 indicates that the target device 262 does not have availability to service the connection request, the method continues at operation 640 by rejecting the connection request for the target device 262. With reference to FIG. 2, in the present invention, SAS expander 215 is configured for rejecting the connection request for the target device 262.

After the connection request has been rejected at operation 640, the method continues at operation 645 by updating the current performance availability value of the target device 262 after a predetermined time period by increasing the current performance availability value of the target device 262 by the maximum performance availability value of the target device 262 up to the maximum performance availability of the target device 262. With reference to FIG. 2, in the present invention, the resolver 245 of the SAS expander 215 is configured for updating the current performance availability value of the target device 262 after a predetermined time period by increasing the current performance availability value of the target device 262 by the maximum performance availability value of the target device 262 up to the maximum performance availability of the target device 262.

In one embodiment, portions of the SAS expander may be implemented in an integrated circuit as a single semiconductor die. Alternatively, the integrated circuit may include multiple semiconductor die that are electrically coupled together such as, for example, a multi-chip module that is packaged in a single integrated circuit package.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The method of the present invention may be stored on a computer readable medium which may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

I claim:

1. A method for controlling the performance of target devices, the method comprising:
   receiving, at a serial attached small computer system interface (SAS) expander, a connection request for a target device of a plurality of target devices coupled to the SAS expander, wherein a maximum performance availability value is associated with the target device;
   determining a current performance availability value for the target device, wherein the current performance availability value of the target device is less than or equal to the maximum performance availability value of the target device;
   determining if the current performance availability value of the target device indicates that the target device has availability to service the connection request;
   accepting the connection request for the target device if the current performance availability value of the target device indicates that the target device does have availability to service the connection request; and
   rejecting the connection request for the target device if the current performance availability value of the target device indicates that the target device does not have availability to service the connection request,
   wherein if the SAS expander does not receive a next connection request for the target device within a predetermined time period, the method further comprises, until the next connection request for the target device is received, updating the current performance availability value of the target device after the predetermined time period by increasing the current performance availability value of the target device by the maximum performance availability value of the target device up to the maximum performance availability value of the target device.

2. The method of claim 1, wherein accepting the connection request for the target device if the current performance availability value of the target device indicates that the target device does have availability to service the connection request further comprises, after accepting the connection request:
   opening a connection between the SAS expander and the target device;
   measuring traffic between the SAS expander and the target device during the connection to determine a measured traffic value;
   closing the connection between the SAS expander and the target device; and
   updating the current performance availability value of the target device by reducing the maximum performance availability value of the target device by the measured traffic value.

3. The method of claim 1, wherein if the SAS expander receives the next connection request for the target device, the method further comprises repeating the determining if a current performance availability value of the target device indicates that the target device does or does not have availability to service the connection request and the accepting or rejecting the next connection request as indicated by the performance availability value of the target device.

4. The method of claim 1, wherein at least some of the plurality of target devices are selected from buffered Hard Disk Drives (HDDs), unbuffered HDDs, buffered Solid State Drives (SSDs) and unbuffered SSDs.

5. The method of claim 2, wherein measuring the traffic between the SAS expander and the target device during the connection to determine a measured traffic value further comprises, measuring a bandwidth (BW) or an input/output operations per second (IOPS) of the traffic during the connection between the SAS expander and the target device.

6. The method of claim 1, wherein rejecting the connection request for the target device if the current performance availability value of the target device indicates that the target device does not have availability to service the connection request further comprises, determining a delay for the next connection request for the target device.

7. A method for controlling the performance of target devices, the method comprising:
   receiving, at a serial attached small computer system interface (SAS) expander, a connection request for a target device of a plurality of target devices coupled to the SAS expander, wherein a maximum performance availability value is associated with the target device;
   determining a current performance availability value for the target device, wherein the current performance availability value of the target device is less than or equal to the maximum performance availability value of the target device;
   determining if the current performance availability value of the target device indicates that the target device has availability to service the connection request;
   accepting the connection request for the target device if the current performance availability value of the target device indicates that the target device does have availability to service the connection request; and
   rejecting the connection request for the target device if the current performance availability value of the target device indicates that the target device does not have availability to service the connection request, and after the rejecting the connection request for the target device, updating the current performance availability value of the target device after a predetermined time period by increasing the current performance availability value of the target device by the maximum performance availability value of the target device up to the maximum performance availability value of the target device.

8. The method of claim 7, wherein if the SAS expander receives a next connection request for the target device, the method further, comprises repeating the determining if a current performance availability value of the target device indicates that the target device does or does not have availability to service the connection request and the accepting or rejecting the next connection request as indicated by the current performance availability value of the target device.

9. The method of claim 7, wherein if the SAS expander does not receive a next connection request for the target device within a predetermined time period, the method further comprises:
updating the current performance availability value of the target device after the predetermined time period by increasing the current performance availability value of the target device by the maximum performance availability of the target device up to the maximum performance availability of the target device.

10. A serial attached small computer system interface (SAS) expander for controlling the performance of one or more target devices, the SAS expander comprising:
circuitry for coupling to one or more target devices;
circuitry for receiving a connection request for one or more of the target device; and
a resolver, the resolver configured to
determine a current performance availability value for the target device, wherein the current performance availability value of the target device is less than or equal to the maximum performance availability value of the target device;
determine if the current performance availability value of the target device indicates that the target device has availability to service the connection request;
accept the connection request for the target device if the current performance availability value of the target device indicates that the target device does have availability to service the connection request;
reject the connection request for the target device if the current performance availability value of the target device indicates that the target device does not have availability to service the connection request; and
if the SAS expander does not receive a next connection request for the target device within a predetermined time period, the resolver is further configured to update the current performance availability value of the target device after the predetermined time period by increasing the current performance availability value of the target device by the maximum performance availability of the target device up to the maximum performance availability of the target device and to continue to update the current performance availability value of the target device up to the maximum performance availability of the target device after each subsequent predetermined time period until the next connection request for the target device is received.

11. The SAS expander of claim 10, wherein, when if the SAS expander receives the next connection request for the target device, the resolver is further configured to again determine if a current performance availability value of the target device indicates that the target device does or does not have availability to service the connection request and to accept or reject the next connection request as indicated by the current performance availability value of the target device.

12. The SAS expander of claim 10, further comprising a target device performance table associated with the target device, the target device performance table for storing the maximum performance availability value and the current performance availability value of the target device.

13. A system comprising:
a target device, wherein a maximum performance availability value is associated with the target device;
a serial attached small computer system interface (SAS) expander coupled to the target device and configured to receive a connection request for the target device, the SAS expander including a resolver configured to:
determine a current performance availability value for the target device, wherein the current performance availability value of the target device is less than or equal to the maximum performance availability value of the target device;
determine if the current performance availability value of the target device indicates that the target device has availability to service the connection request;
accept the connection request for the target device if the current performance availability value of the target device indicates that the target device does have availability to service the connection request;
reject the connection request for the target device if the current performance availability value of the target device indicates that the target device does not have availability to service the connection request; and
if the SAS expander does not receive a next connection request for the target device within a predetermined time period, update the current performance availability value of the target device after the predetermined time period by increasing the current performance availability value of the target device by the maximum performance availability value of the target device up to the maximum performance availability value of the target device and continue to update the current performance availability value of the target device up to the maximum performance availability of the target device after each subsequent predetermined time period until the next connection request for the target device is received at the SAS expander.

14. The system of claim 13, wherein, if the resolver accepts the connection request, the SAS expander is further configured to:
open a connection between the SAS expander and the target device;
measure traffic between the SAS expander and the target device during the connection to determine a measured traffic value; and
close the connection between the SAS expander and the target device.

15. The system of claim 14, wherein, if the resolver accepts the connection request, the SAS expander is further configured to update the current performance availability value of the target device by reducing the maximum performance availability value of the target device by the measured traffic value.

16. The system of claim 13, wherein when the SAS expander receives the next connection request for the target device, the resolver is further configured to again determine if a current performance availability value of the target device indicates that the target device does or does not have availability to service the connection request and to accept or reject the next connection request as indicated by the current performance availability value of the target device.

17. The system of claim 13, the target device is selected from a buffered Hard Disk Drive (HDDs), an unbuffered HDD, a buffered Solid State Drive (SSD) and an unbuffered SSD.

18. A system comprising:
a target device, wherein a maximum performance availability value is associated with the target device;
a serial attached small computer system interface (SAS) expander coupled to the target device and configured to receive a connection request for the target device, the SAS expander including a resolver configured to:
determine a current performance availability value for the target device, wherein the current performance availability value of the target device is less than or equal to the maximum performance availability value of the target device;
determine if the current performance availability value of the target device indicates that the target device has availability to service the connection request;
accept the connection request for the target device if the current performance availability value of the target device indicates that the target device does have availability to service the connection request; and
reject the connection request for the target device if the current performance availability value of the target device indicates that the target device does not have availability to service the connection request and if the connection request for the target device is rejected, update the current performance availability value of the target device after a predetermined time period by increasing the current performance availability value of the target device by the maximum performance availability value of the target device up to the maximum performance availability value of the target device.

* * * * *

UNITED STATES PATENT AND TRADEMARK OFFICE
CERTIFICATE OF CORRECTION

PATENT NO.         : 10,614,012 B2
APPLICATION NO.    : 16/197109
DATED              : April 7, 2020
INVENTOR(S)        : Sanjay Goyal Page 1 of 1

It is certified that error appears in the above-identified patent and that said Letters Patent is hereby corrected as shown below:

In the Claims

Column 19, Line 66 In Claim 11, delete the word "if"

Signed and Sealed this
Twenty-first Day of July, 2020

Andrei Iancu
*Director of the United States Patent and Trademark Office*